Aug. 7, 1928.
H. S. KNIGHT
1,680,152
COMBINED FUEL VAPORIZER AND AUXILIARY AIR INLET DEVICE
Filed Aug. 9, 1926
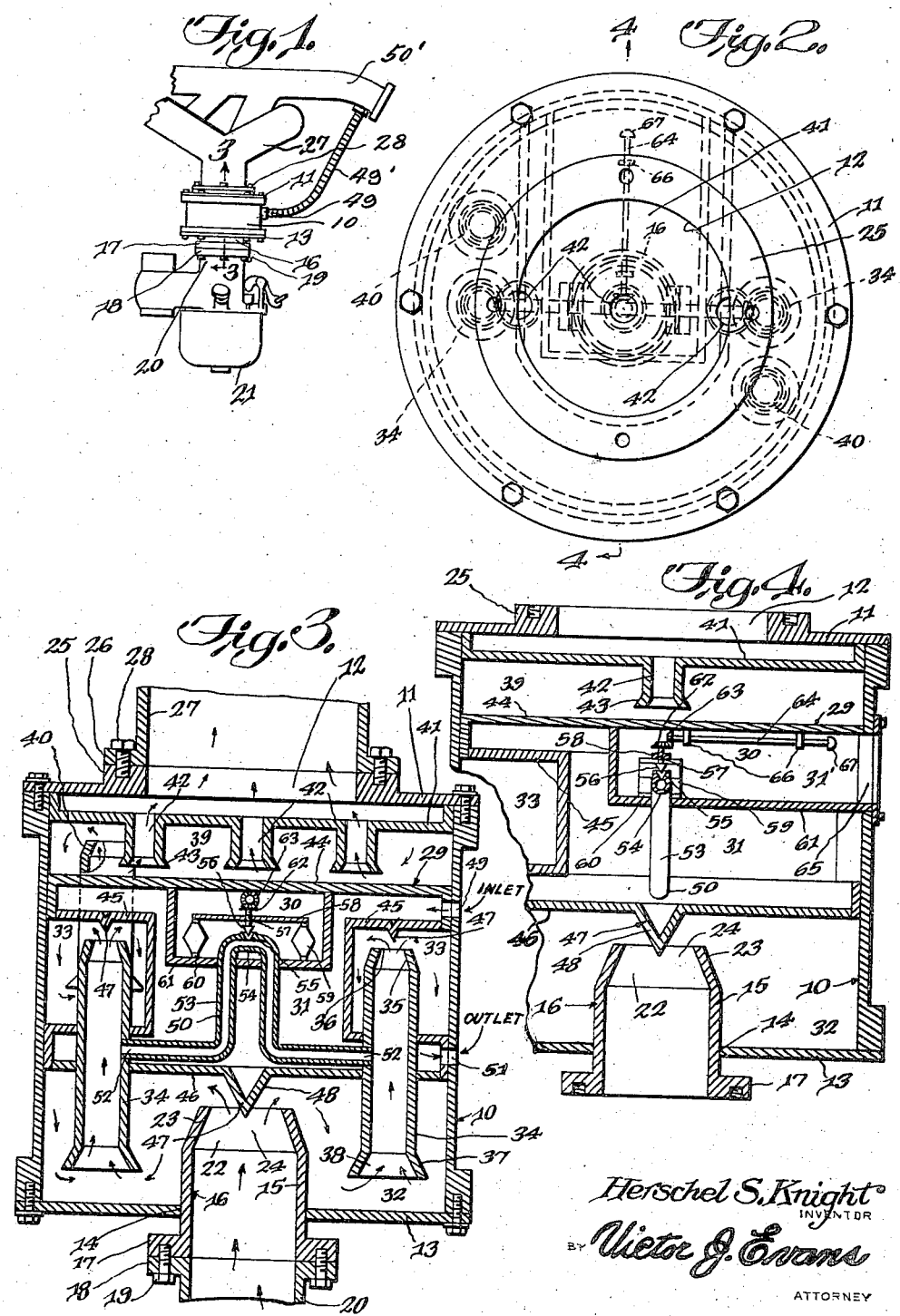
Herschel S. Knight, INVENTOR
By Victor J. Evans, ATTORNEY Patented Aug. 7, 1928.

1,680,152

UNITED STATES PATENT OFFICE.

HERSCHEL S. KNIGHT, OF INDIANAPOLIS, INDIANA.

COMBINED FUEL VAPORIZER AND AUXILIARY AIR-INLET DEVICE.

Application filed August 9, 1926. Serial No. 128,218.

This invention relates to a novel combined fuel vaporizer and auxiliary air inlet device and particularly to a fuel vaporizer adapted to be disposed between the outlet of the carburetor and the inlet of the inlet manifold of an internal combustion engine.

Among the several objects of the invention is the provision of an improved construction of this character which will be highly efficient in use and economical in manufacture.

A further object of the invention is the provision of a vaporizer adapted to be associated with a carburetor and an intake manifold of an internal combustion engine for effectively vaporizing fuel before it passes from the carburetor to the intake manifold. This is accomplished by providing a body having an inlet and outlet opening adapted for communication with the outlet and inlet of a carburetor and intake manifold respectively and said body being formed to define a plurality of compartments in communication with each other to provide a passage for the fuel from the carburetor through the vaporizer and into the manifold and the vaporizer is constructed in a manner so as to admit heated atmospheric air to the fuel as it passes through the compartments. It is pointed out that from the description hereinafter set forth it will be manifest that the communication from one compartment to the preceding compartment takes place from the bottom of the said one compartment to the top of the said preceding compartment thereby assuring complete passage of the vaporized fuel. This results from the fact that as fuel vaporizes the most explosive component part of the fuel tends to settle to the bottom of the compartments and by providing an outlet at the bottom of each of the compartments this explosive component part of the fuel is forced to find exit from the compartments.

Other objects will appear hereinafter.

The invention consists in the novel combination and arrangement of parts to be hereinafter described and claimed.

The invention will be best understood by reference to the accompanying drawing showing the preferred form of construction and in which:

Fig. 1 is a fragmentary elevational view of an intake manifold and a side elevational view of a carburetor illustrating the invention associated therewith.

Fig. 2 is a top plan view of the invention.

Fig. 3 is a sectional detail view taken substantially on line 3—3 of Fig. 1.

Fig. 4 is a fragmentary sectional detail view taken substantially on line 4—4 of Fig. 2.

To accomplish the various objects of the invention I provide a cylindrical body 10 having a removable top wall 11 defining an outlet opening 12 and a bottom wall 13 defining a centrally located opening 14 for the passage of the shank portion 15 of a nipple 16. This nipple 16 defines a flange 17 which is secured to the flange 18 of the outlet neck 20 of the carburetor 21 by means of bolts 19. The interior end portion 22 of the nipple 15 is swedged inwardly as at 23 to define a restricted passage 24 as best shown in Fig. 3.

The top wall 11 defines a lateral boss 25 to which is connected a flange 26 of an intake manifold 27 through the medium of bolts 28.

Arranged in the cylindrical body 10 is a second body 29 defining a cooling chamber 30 and a heating chamber 31, the body 29 being disposed in spaced relation with the bottom wall 13 and this body defines together with a cylindrical body 10 and its bottom wall 13 an expansion chamber 32 in communication with mixing chambers 33 through the medium of stud pipes 34. These stud pipes 34 have their upper end portions swedged inwardly as at 35 to define restricted passages 36 while the lower end portions of these stud pipes define outwardly flaring end portions 37 to provide enlarged entrance openings 38.

The mixing chambers 33 communicate with a discharge chamber 39 through the medium of conduits 40, Figs. 2 and 3. Arranged within the discharge chamber 39, which chamber functions as a final expansion chamber, is a plate 41 defining depending tubes 42 having their lower end portions flared outwardly to define enlarged mouths 43 and these tubes 42 open communication between the chamber 39 and the intake manifold 27.

As shown in Fig. 3 these tubes 42 have their lower end portions disposed a predetermined distance above the top wall 44 of the body 29 for reasons herein explained. Likewise it will be noted in Fig. 3 that the lower end portions of the stud pipes 34 are disposed a predetermined distance from the bottom wall 13 whereas the upper end portions of these stud pipes are disposed a predetermined distance from the adjacent wall portions 45 of the body 29. The bottom wall 46 and the wall portions 45 define depending projections 47 which are disposed centrally of the upper end portions of the nipple 16 and stud pipes 34 and these projections are substantially V-shaped in cross section to provide deflecting side walls 48.

Communicating with the heating chamber 31 is an inlet opening 49, Fig. 3, and this inlet opening is in communication through the medium of a conduit 49' with an exhaust manifold 50' of an internal combustion engine with which the intake manifold 27 is associated and the arrangement is such that the exhaust will find entrance into the heating chamber and circulate around and heat a conduit 50 after which the exhaust will find exit through an outlet opening 51, Fig. 3. This conduit 50 has its end portions 52 connected in communication with the stud pipes 34 intermediate their end portions and the intermediate portion of this conduit is substantially U-shaped with the limb portions 53 thereof confined in the heating chamber 31. The bight portion 54 of this conduit is confined in the air supplying chamber 30 herein referred to as a cooling chamber. This bight portion defines a valve seat 55 which is adapted for engagement with a valve head 56 carried by a stem 57 in turn carried by a bridging plate 58 having opposite end portions connected to end portions of thermostatic elements 59 which elements have their lower end portions connected as at 60 to adjacent wall portions 61 of the body 29. The stem 57 carries a bevel gear 62 which is adapted under certain conditions, that is when the thermostatic elements are inoperative and the valve head in its uppermost position, with the bevel gear 63 carried by the operating shaft 64. This operating shaft is confined in an entrance chamber 31' which communicates with the air supply chamber 30 and admission of air to this chamber is permitted through an inlet opening 65 formed in the cylindrical body 10.

The operating shaft 64 is rotatably supported by the body 29 through the medium of brackets 66, Fig. 4, and this operating shaft 64 defines at its outer end portion a knob 67 which affords manual manipulation of the operating rod.

In use my improved carburetor attachment is confined between the outlet of an intake manifold of an internal combustion engine and the outlet of a carburetor as best shown in Fig. 1 of the drawing and the vaporizer is secured in position, to the flanges 18 and 26 through the medium of the bolts 19 and 28. A certain amount of fuel as it passes through the carburetor 21 will be partially vaporized. However, there will be a considerable amount of condensation mixed with the vaporized fuel. This partially vaporized fuel passes upwardly through the nipple 16 and strikes the deflecting surface 48 of the wall 46. These surfaces deflect the partially vaporized fuel downwardly within the expansion chamber 32. After considerable expansion of the partially vaporized fuel it passes upwardly from the bottom of the expansion chamber 32 through the stud pipes 34 into the mixing chambers 33 at the tops thereof. During the passage of the partially vaporized fuel through the stud pipes 34 a certain amount of air is drawn through the conduit 50. This air is cooled air from the chamber 30 and is heated as it passes through the limb portions 53 into the end portions of the conduits to find confinement in the mixing chambers 33 by the exhaust which is admitted to the heating chamber through the inlet opening 49. From the mixing chamber 33 the fuel is practically completely vaporized and the now vaporized fuel finds exit into the discharge chamber 39 through the tubes 42 from the bottom of this discharge chamber up through the intake manifold and thence into the combustion chambers of the internal combustion engine.

The thermostatic elements control the amount of atmospheric air which finds passage through the conduit 50 and this is accomplished in the following manner. When the atmospheric air is of a high temperature it is necessary to diminish the supply of atmospheric air to the conduit 50 and when this is the case the thermostatic elements will operate in a well known manner and move the valve head 56 into closing position with respect to the valve seat 55. As the temperature of the atmospheric air lowers the thermostatic elements will likewise operate in a known manner and open the entrance to the conduit 50 according to the lowering of the temperature of the atmospheric air.

These thermostatic elements are only diagrammatically illustrated in the drawing and they do not per se form a part of the present invention as any approved style of thermostatic elements may be used.

I have found by experience that by the employment of my vaporizer fuel as it leaves the carburetor is more readily vaporized thereby increasing the power of the internal combustion engine lengthening the mileage per gallon of fuel.

While I have shown and described the preferred form of construction for carrying my invention into effect, it will be apparent that various variations and modifications can be resorted to without departing from the spirit of the invention. I, therefore, do not desire to be limited to the precise details of construction set forth, but wish to avail myself of such variations and modifications as come within the scope of the appended claims.

The invention having been set forth, what I claim as new and desire to secure by Letters Patent is:

1. A device of the class described including an outer body defining an inlet and outlet opening, an inner body confined within the outer body and dividing the outer body into an expansion chamber, a mixing chamber, and a discharge chamber, said discharge chamber being in communication with said outlet opening said mixing chamber being in communication with said discharge chamber and said expansion chamber being in communication with the inlet opening, said inner body defining an air supply chamber and a heating chamber, means opening communication from the bottom portion of the expansion chamber to the top portion of the mixing chamber, and a member in communication with said means having thermostatically operated passage controlling means therein and defining a portion confined in and in communication with the air supply chamber and portions confined in the heating chamber, said member being adapted to deliver atmospheric air from the air supply chamber to the mixing chamber, and said heating chamber being adapted to receive exhaust gas from the exhaust manifold of an internal combustion engine and the exhaust gas being adapted to heat the air as delivered by the member to said means.

2. A device of the class described including an outer body defining an inlet and outlet opening, an inner body confined within the outer body and dividing the outer body into an expansion chamber, a mixing chamber, and a discharge chamber, said discharge chamber being in communication with said outlet opening said mixing chamber being in communication with said discharge chamber and said expansion chamber being in communication with the inlet opening, said inner body defining an air supply chamber and a heating chamber, means opening communication from the bottom portion of the expansion chamber to the top portion of the mixing chamber, and a member in communication with said means having thermostatically operated passage controlling means therein and defining a portion confined in and in communication with the air supply chamber and portions confined in the heating chamber, said member being adapted to deliver atmospheric air from the air supply chamber to the mixing chamber, said heating chamber being adapted to receive exhaust gas from the exhaust manifold of an internal combustion engine and the exhaust gas being adapted to heat the air as delivered by the member to said means, and means for controlling the passage of atmospheric air from the air supply chamber to said member.

3. A device of the class described including an outer body defining an inlet and outlet opening, an inner body confined within the outer body and dividing the outer body into an expansion chamber, a mixing chamber, and a discharge chamber, said discharge chamber being in communication with said outlet opening; said mixing chamber being in communication with said discharge opening and said expansion chamber being in communication with the inlet opening, said inner body defining an air supply chamber and a heating chamber, means opening communication from the bottom portion of the expansion chamber to the top portion of the mixing chamber, and a member in communication with said means having thermostatically operated passage controlling means therein and defining a portion confined in and in communication with the air supply chamber and portions confined in the heating chamber, said member being adapted to deliver atmospheric air from the air supply chamber to the mixing chamber, and said heating chamber being adapted to receive exhaust gas from the exhaust manifold of an internal combustion engine, and the exhaust gas being adapted to heat the air as delivered by the member to said means, means controlling the admission of atmospheric air to said member from said air supply chamber and thermostatic elements controlling said last mentioned means.

4. A device including an outer body defining an inlet and an outlet opening, an inner body confined within the outer body and dividing the outer body into an expansion chamber, mixing chambers, and a discharge chamber, said inner body defining a heating chamber, said discharge chamber being in communication with the outlet opening and said expansion chamber being in communication with the inlet opening, means opening communication from the bottom portion of the expansion chamber and the top portion of the mixing chambers, conduits opening communication from the bottom portion of the mixing chambers to the top portion of the discharge chamber, a conductor pipe having end portions in communication with said means, said conductor pipe defining an intermediate portion bent substantially U-shaped, the bight portion of said U-shaped portion being confined in and in communication with the air supply chamber, and the remaining portion of the U-shaped portion being confined in the heating chamber, said air supply chamber being adapted to deliver atmospheric air to said conductor pipe and said heating chamber being adapted for communication with the exhaust manifold of an internal combustion engine, and thermostatically operated means for controlling delivery of atmospheric air from the air supply chamber to the conductor pipe.

5. A device including an outer body defining an inlet and outlet opening, an inner body confined within the outer body and dividing the outer body into an expansion chamber, mixing chambers, and a discharge chamber, said inner body defining a heating chamber said discharge chamber being in communication with the outlet opening and said expansion chamber being in communication with the inlet opening, means opening communication from the bottom portion of the expansion chamber and the top portion of the mixing chambers, conduits opening communication from the bottom portion of the mixing chambers to the top portion of the discharge chamber, a conductor pipe having end portions in communication with said means, said conductor pipe defining an intermediate portion bent substantially U-shaped, the bight portion of said U-shaped member being confined in and in communication with the air supply chamber and the remaining portion of the U-shaped portion being confined in the heating chamber, said air supply chamber being adapted to deliver atmospheric air to said conductor pipe and said heating chamber being adapted for communication with an exhaust manifold of an internal combustion engine, means regulating the admission of atmospheric air from the air supply chamber to the conductor pipe, and thermostatic elements for controlling said regulating means.

6. A device of the class described including a body defining a plurality of compartments and an inlet opening and an outlet opening, said compartments being in communication with each other and said communication being from to the bottom portion of one compartment to the top portion of the other compartment, a nipple projecting through the inlet opening within the body, a second body confined within the first mentioned body and defining a mixing chamber and an air supply chamber, said second body having a bottom wall defining deflecting surfaces extending into the nipple, and thermostatically operated means for delivering atmospheric air from the air supply chamber to certain of the first mentioned compartments, said last named means having thermostatically operated means therein for controlling air passage therethrough said means conducting said atmospheric air through a heating chamber.

In testimony whereof I affix my signature.

HERSCHEL S. KNIGHT.